(12) United States Patent
Liu et al.

(10) Patent No.: US 10,638,459 B2
(45) Date of Patent: Apr. 28, 2020

(54) INFORMATION TRANSMISSION METHOD, APPARATUS, AND SYSTEM

(71) Applicant: HUAWEI TECHNOLOGIES CO., LTD., Shenzhen, Guangdong (CN)

(72) Inventors: Yalin Liu, Shenzhen (CN); Rongdao Yu, Shenzhen (CN); Tizheng Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/933,595

(22) Filed: Mar. 23, 2018

(65) Prior Publication Data

US 2018/0213519 A1 Jul. 26, 2018

Related U.S. Application Data

(63) Continuation of application No. PCT/CN2015/100304, filed on Dec. 31, 2015.

(51) Int. Cl.
*H04W 72/04* (2009.01)
*H04W 4/02* (2018.01)
(Continued)

(52) U.S. Cl.
CPC ......... *H04W 72/0406* (2013.01); *H04L 29/08* (2013.01); *H04W 4/025* (2013.01);
(Continued)

(58) Field of Classification Search
CPC ....... H04W 4/02; H04W 4/025; H04W 4/026; H04W 4/046; H04W 4/30; H04W 4/40;
(Continued)

(56) References Cited

U.S. PATENT DOCUMENTS 9,357,571 B2 * 5/2016 Gao ................... H04W 84/045
2011/0105082 A1 5/2011 Haley
(Continued)

FOREIGN PATENT DOCUMENTS

| CN | 101415243 A | 4/2009 |
|---|---|---|
| CN | 101778356 A | 7/2010 |

(Continued)

OTHER PUBLICATIONS

International Search Report issued in International Application No. PCT/CN2015/100304 dated Oct. 10, 2016, 15 pages.
(Continued)

*Primary Examiner* — Tri H Phan
(74) *Attorney, Agent, or Firm* — Fish & Richardson P.C.

(57) ABSTRACT

An information transmission method, an apparatus, and a system are disclosed. A first base station may identify, according to indication information, global information and local information in uplink information sent by user equipment. If the indication information indicates that the uplink information includes the global information, the first base station uploads the global information to a core network device. If the indication information indicates that the uplink information includes the local information, the first base station directly delivers the local information to a neighboring base station to cause the neighboring base station to deliver the local information to user equipment in a cell covered by the neighboring base station.

19 Claims, 6 Drawing Sheets

(51) Int. Cl.
  *H04W 4/30* (2018.01)
  *H04L 29/08* (2006.01)
  *H04W 4/40* (2018.01)
  *H04W 88/08* (2009.01)

(52) U.S. Cl.
  CPC .............. *H04W 4/30* (2018.02); *H04W 4/40* (2018.02); *H04W 88/08* (2013.01)

(58) Field of Classification Search
  CPC ... H04W 4/46; H04W 36/0009; H04W 40/02; H04W 48/04; H04W 72/04; H04W 72/0406; H04W 84/005; H04W 88/08; H04L 69/22
  See application file for complete search history.

(56) References Cited

U.S. PATENT DOCUMENTS

| | | |
|---|---|---|
| 2012/0290650 A1 | 11/2012 | Montuno |
| 2017/0019917 A1 | 1/2017 | Ma |
| 2017/0069207 A1 | 3/2017 | Ma |
| 2017/0188215 A9 | 6/2017 | Guo et al. |
| 2018/0124574 A1* | 5/2018 | Byun .................... H04W 4/06 |
| 2018/0152819 A1* | 5/2018 | Pinheiro ................ H04W 4/40 |
| 2018/0295481 A1* | 10/2018 | Kahtava ................ H04W 4/70 |
| 2019/0020987 A1* | 1/2019 | Khoryaev ............... H04W 4/46 |
| 2019/0090099 A1* | 3/2019 | Wang .................... H04L 45/38 |
| 2019/0104450 A1* | 4/2019 | Adachi .............. H04W 36/0072 |

FOREIGN PATENT DOCUMENTS

| | | |
|---|---|---|
| CN | 103037418 A | 4/2013 |
| CN | 103503540 A | 1/2014 |
| CN | 104158580 A | 11/2014 |
| CN | 104754613 A | 7/2015 |
| CN | 104980391 A | 10/2015 |
| CN | 105100167 A | 11/2015 |
| WO | 02103652 A1 | 12/2002 |
| WO | 2015079630 A1 | 6/2015 |
| WO | 2015149576 A1 | 10/2015 |
| WO | 2015176510 A1 | 11/2015 |

OTHER PUBLICATIONS

Extended European Search Report issued in European Application No. 15912008.8 dated Jul. 27, 2018, 10 pages.
Office Action issued in Chinese Application No. 201580085676.8 dated Oct. 28, 2019, 9 pages.
Yi-Bing Lin et al. Improving Handover and Drop-off Performance on High-Speed Trains With Multi-RAT, IEEE Transactions on Intelligent Transportation Systems, IEEE 2014. Total 6 pages.

* cited by examiner

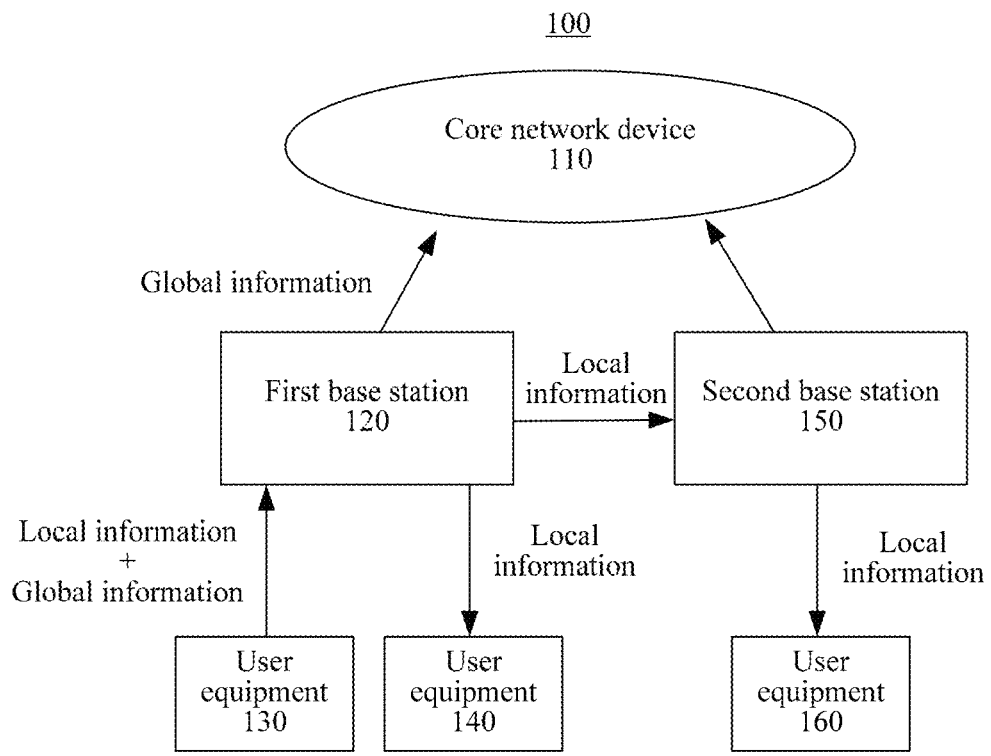
FIG. 1-a
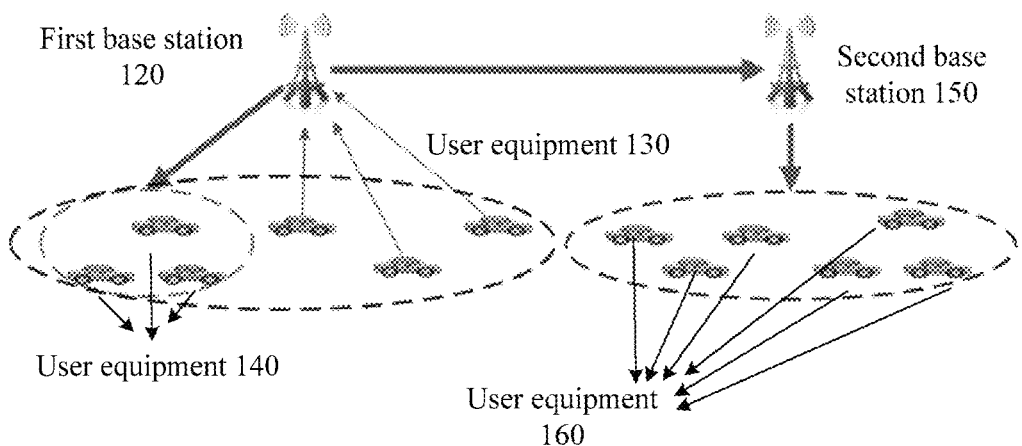
FIG. 1-b

INFORMATION TRANSMISSION METHOD, APPARATUS, AND SYSTEM

CROSS-REFERENCE TO RELATED APPLICATIONS

This application is a continuation of International Application No. PCT/CN2015/100304, filed on Dec. 31, 2015, the disclosure of which is hereby incorporated by reference in its entirety.

TECHNICAL FIELD

The present invention relates to the communications field, and in particular, to an information transmission method, an apparatus, and a system.

BACKGROUND

At present, communications technologies in high-speed movement scenarios have attracted more attentions from technical staffs. For example, there are more researches on intelligent transport technologies represented by driverless driving. Driverless driving is also referred to as intelligent driving or autonomous driving.

An intelligent transport system (ITS) is also referred to as an intelligent transportation system (Intelligent Transportation System). According to the intelligent transport system, an information technology, a computer technology, a data communications technology, a sensor technology, an electronic control technology, an automatic control technology, an artificial intelligence technology, and the like are applied to transportation, service control, and vehicle manufacturing, so as to strengthen a connection among a vehicle, a road, and a user, thereby forming an integrated transportation system for safety assurance, efficiency improvement, environmental enhancement, and energy saving.

In the intelligent transport system, a vehicle needs to be authenticated by a network control center and needs to be capable of implementing roaming and handover during high-speed driving. The vehicle needs to periodically report location information, and the location information needs to be transferred to surrounding vehicles with an extremely short delay. Similar problems also exist in communications systems that are similar to the intelligent transport system and have a short-delay requirement. For example, in such communications systems, information exchanged between user equipments needs to be transmitted by using a radio access network device and a core network device. Consequently, a transmission delay of such information is relatively long and the short-delay requirement cannot be met. Therefore, it cannot be ensured that each vehicle can receive, in a timely manner, instant information sent from another vehicle. The instant information is information (which belongs to local information mentioned in the present invention) having a very high requirement on real-time performance of transmission. For example, the instant information is information such as braking, acceleration, a lane change, an accident, and a sudden fault. The information directly affects an intelligent transport order.

Therefore, when a vehicle brakes, accelerates, or decelerates, how to quickly transfer driving status information to a vehicle nearby, to avoid a traffic accident, and how to reduce a transmission delay of an intelligent transport system are problems to be urgently resolved in the intelligent transport system.

SUMMARY

This application provides an information transmission method, a base station, and a system, and provides a solution of transmitting data information in neighboring cells with a short delay. After user equipment uploads local information, the base station directly forwards the information to a neighboring base station without using a core network, and the neighboring base station immediately delivers the information to user equipment within coverage, so as to shorten a transmission path of the data information, reduce a transmission delay of the data information, and improve a transmission speed of the data information. In addition, the information is not transmitted by the core network, so that load of the core network is alleviated. Therefore, an information transmission delay can be reduced for information that needs to be quickly transmitted, thereby effectively ensuring timeliness of information transmission in a communications system, especially in an intelligent transport system.

According to a first aspect, this application provides an information transmission method. A first base station receives uplink information sent by first user equipment, where the uplink information includes first information, the first information includes indication information, the indication information is used to indicate whether the first information is global information or local information, and the first user equipment is in a communications cell covered by the first base station. The first base station determines, according to the indication information, whether the first information is the global information or the local information. If the first base station determines that the first information is the local information, the first base station sends the first information to a second base station, where the second base station is a base station that is in a preset neighboring cell list and that has a neighboring relationship with the first base station. If the first base station determines that the first information is the global information, the first base station sends the first information to a core network device.

According to a second aspect, this application provides a base station. The base station includes: a receiving unit, configured to receive uplink information sent by first user equipment, where the uplink information includes first information, the first information includes indication information, the indication information is used to indicate whether the first information is global information or local information, and the first user equipment is in a communications cell covered by the first base station; a determining unit, configured to determine, according to the indication information in the uplink information received by the receiving unit, whether the first information is the global information or the local information; and a sending unit, configured to: if the determining unit determines that the first information is the local information, send the first information to a second base station, where the second base station is a base station that is in a preset neighboring cell list and that has a neighboring relationship with the first base station; and the sending unit is further configured to: if the determining unit determines that the first information is the global information, send the first information to a core network device.

Based on the technical solution of this application, the base station may identify, according to the indication information in the uplink information, the global information and the local information in the uplink information sent by the user equipment; and if the indication information indicates that the uplink information includes the global information, uploads the global information to the core network device; or if the indication information indicates that the uplink information includes the local information, directly delivers the local information to neighboring base stations, so that the neighboring base stations can deliver the local information to user equipments in their communications cells. Therefore, an information propagation scope is larger and no dead corner is left. In addition, because the local information does not need to be forwarded by a core network, a transmission delay of the local information is reduced, and a delay of a communications system is reduced.

According to the first aspect or the second aspect, in a possible design, if the first base station determines that the first information is the local information, the method further includes: adding, by the first base station, a label to the first information, where the label is used to indicate, to the second base station, that the first information is the local information, so that the second base station sends the first information to second user equipment, where the second user equipment is in a communications cell covered by the second base station.

According to the first aspect or the second aspect, in a possible design, if the first base station determines that the first information is the local information, the method further includes: sending, by the first base station, the first information to third user equipment, where the third user equipment is in the communications cell covered by the first base station.

According to the first aspect or the second aspect, in a possible design, the first base station sends the local information to the second base station by using an X2 interface.

According to the first aspect or the second aspect, in a possible design, the indication information is a newly added indicator field in the first information, the indicator field is a first identifier or a second identifier, the first identifier is used to indicate that the first information is the global information, the second identifier is used to indicate that the first information is the local information, and the first identifier is different from the second identifier.

According to the first aspect or the second aspect, in a possible design, the indication information is destination address information, the destination address information is a first address or a second address, the first address is used to indicate that the first information is the global information, the second address is used to indicate that the first information is the local information, the first address is different from the second address, the first address includes an address of the core network device, and the second address includes an address other than the address of the core network device.

According to the first aspect or the second aspect, in a possible design, the indication information is a frame format of the first information, the frame format includes a modulation scheme, the global information is modulated by using a first carrier, the local information is modulated by using a second carrier, and there is a preset phase difference between the first carrier and the second carrier.

According to the first aspect or the second aspect, in a possible design, the local information includes driving status information of vehicles on the Internet of Vehicles, and the driving status information is used by the second user equipment or third user equipment to perform driving control.

According to the first aspect or the second aspect, in a possible design, if the base station receives uplink information sent by at least one first user equipment and the base station determines that at least one piece of corresponding first information is local information, the method further includes: processing, by the base station, the received at least one piece of first information according to a preset rule, to obtain first local information; and that the base station sends the first information to at least one second user equipment is specifically: The base station sends the first local information to the at least one second user equipment.

According to the first aspect or the second aspect, in a possible design, the processing, by the base station, the received at least one piece of first information according to a preset rule, to obtain first local information includes: if identical content exists in the at least one piece of first information, combining parts that are of the at least one piece of first information and that have the identical content, to obtain the first local information.

According to the first aspect or the second aspect, in a possible design, the first user equipment and the second user equipment include an on-board unit attached to a vehicle in an intelligent transport system. The global information includes information used by the intelligent transport system to perform transport control, and the local information includes information used by the at least one second user equipment to perform driving control.

According to the first aspect or the second aspect, in a possible design, if the first base station determines that the first information is the global information, the method further includes: sending, by the first base station, the first information to the core network device.

According to a third aspect, this application provides an information transmission method. A second base station receives first information sent by a first base station. The first information includes indication information, and the indication information is used to indicate whether the first information is local information. The first base station is a base station that is in a preset neighboring cell list and that has a neighboring relationship with the second base station. The second base station determines, according to the indication information, whether the first information is the local information. If the second base station determines that the first information is the local information, the second base station sends the first information to second user equipment. The second user equipment is in a communications cell covered by the second base station.

According to a fourth aspect, this application provides a base station. The base station includes: a receiving unit, configured to receive first information sent by a first base station, where the first information includes indication information, the indication information is used to indicate whether the first information is local information, and the first base station is a base station that is in a preset neighboring cell list and that has a neighboring relationship with the base station; a determining unit, configured to determine, according to the indication information in the first information received by the receiving unit, whether the first information is the local information; and a sending unit, configured to: if the determining unit determines that the first information is the local information, send the first information to second user equipment, where the second user equipment is in a communications cell covered by the base station.

Based on the technical solutions of this application, the base station can receive and identify local information sent by a neighboring base station, so that the base station receives not only local information sent by user equipment in a communications cell covered by the base station, but also local information sent by user equipment in a communications cell covered by the neighboring base station, so that an information receiving scope is larger and no dead corner is left. Therefore, the local information can be effectively delivered to the user equipment in the cell covered by the base station, and the user equipment can make a corresponding policy adjustment according to sufficient information. In addition, because the local information does not need to be forwarded by a core network, a transmission delay of the local information is reduced, and a delay of a communications system is reduced.

According to the third aspect or the fourth aspect, in a possible design, the indication information is a label that is added to the first information when the first base station determines that the first information is the local information, and the label is used to indicate, to the second base station, that the first information is the local information.

According to the third aspect or the fourth aspect, in a possible design, the indication information is a newly added indicator field in the first information, the indicator field is a first identifier or a second identifier, the first identifier is used to indicate that the first information is global information, the second identifier is used to indicate that the first information is the local information, and the first identifier is different from the second identifier.

According to the third aspect or the fourth aspect, in a possible design, the indication information is destination address information, the destination address information is a first address or a second address, the first address is used to indicate that the first information is global information, the second address is used to indicate that the first information is the local information, the first address is different from the second address, the first address includes an address of a core network device, and the second address includes an address other than the address of the core network device.

According to the third aspect or the fourth aspect, in a possible design, the indication information is a frame format of the first information, the frame format includes a modulation scheme, global information is modulated by using a first carrier, the local information is modulated by using a second carrier, and there is a preset phase difference between the first carrier and the second carrier.

According to a fifth aspect, the present invention provides a base station, where the base station includes: a processor, a memory, a transceiver, and a bus system, where the processor, the memory, and the transceiver are connected to and communicate with each other by using the bus system; the memory stores an instruction; and the processor invokes the instruction to control the transceiver to perform any one of the foregoing possible design method and an equivalent method.

According to a sixth aspect, the present invention provides a communications system, where the system includes the base station according to any possible implementation of the second aspect and the base station according to any possible implementation of the fourth aspect.

According to a seventh aspect, this application provides an information transmission method. User equipment generates uplink information, where the uplink information includes first information. The user equipment sets indication information in the first information, where the indication information is used to indicate whether the first information is global information or local information. The user equipment sends the uplink information to a base station, so that the base station can determine, according to the indication information, whether the first information is the local information or the global information.

According to an eighth aspect, this application provides user equipment. The user equipment includes: a generation unit, configured to generate uplink information, where the uplink information includes first information; a setting unit, configured to set indication information in the first information, where the indication information is used to indicate whether the first information is global information or local information; and a sending unit, configured to send the uplink information to a base station, so that the base station can determine, according to the indication information, whether the first information is the local information or the global information.

Based on the technical solutions of this application, the user equipment may set the indication information of the global information and the local information in the sent uplink information, so that the base station can identify the global information and the local information in the uplink information sent by the user equipment, upload the global information to a core network device, and directly deliver the local information to another local user equipment. Because the local information does not need to be forwarded by a core network, a transmission delay of the local information is reduced, and a delay of a communications system is reduced.

According to the seventh aspect and the eighth aspect, in a possible design, the indication information includes an indicator field added to the first information, the indicator field includes a first identifier or a second identifier, the first identifier is used to indicate that the first information is the global information, the second identifier is used to indicate that the first information is the local information, and the first identifier is different from the second identifier; and the setting, by the user equipment, indication information in the first information includes: if the first information is the global information, setting, by the user equipment, the first identifier in the indicator field; or if the first information is the local information, setting, by the user equipment, the second identifier in the indicator field.

According to the seventh aspect and the eighth aspect, in a possible design, the indication information includes destination address information; and the setting, by the user equipment, indication information in the first information includes: if the first information is the global information, setting, by the user equipment in the first information, destination address information indicating that the first information is sent to the core network device; or if the first information is the local information, setting, by the user equipment in the first information, destination address information indicating that the first information is sent to at least one second user equipment.

According to the seventh aspect and the eighth aspect, in a possible design, the indication information is frame format information, frame format information of the global information is different from frame format information of the local information, and the frame format information includes one of the following information: a modulation scheme of the first information, a length of a frame of the first information, and a quantity of fields in the frame of the first information. The setting, by the user equipment, indication information in the first information includes: if the first information is the global information, setting, by the user equipment, a frame format of the first information as a frame format of the global information; or if the first information is the local information, setting, by the user equipment, a frame format of the first information as a frame format of the local information.

In some implementations, the first user equipment, the second user equipment, and the third user equipment separately include an on-board unit attached to a vehicle in an intelligent transport system. The global information includes information used by the intelligent transport system to perform transport control, and the local information includes information used by the at least one second user equipment and the third user equipment to perform driving control. In the intelligent transport system, when a vehicle performs an action such as braking, acceleration, or deceleration during autonomous driving, the vehicle needs to quickly send information related to these actions to a vehicle nearby. In this application, such type of information is defined as local information. In addition, when receiving such type of information sent by each vehicle, a base station directly transmits such type of information to another vehicle within coverage of the base station without using a core network device, so that a transmission delay of such type of information is reduced, and a traffic accident caused by an excessively long delay is avoided.

It is clearer and easier to understand the foregoing and other aspects of the present invention in descriptions of the following multiple embodiments.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1-a is a schematic architectural diagram of a communications system 100 according to an embodiment of the present invention;

FIG. 1-b is an application scenario of a transport communications system;

DESCRIPTION OF EMBODIMENTS

Figure 2:
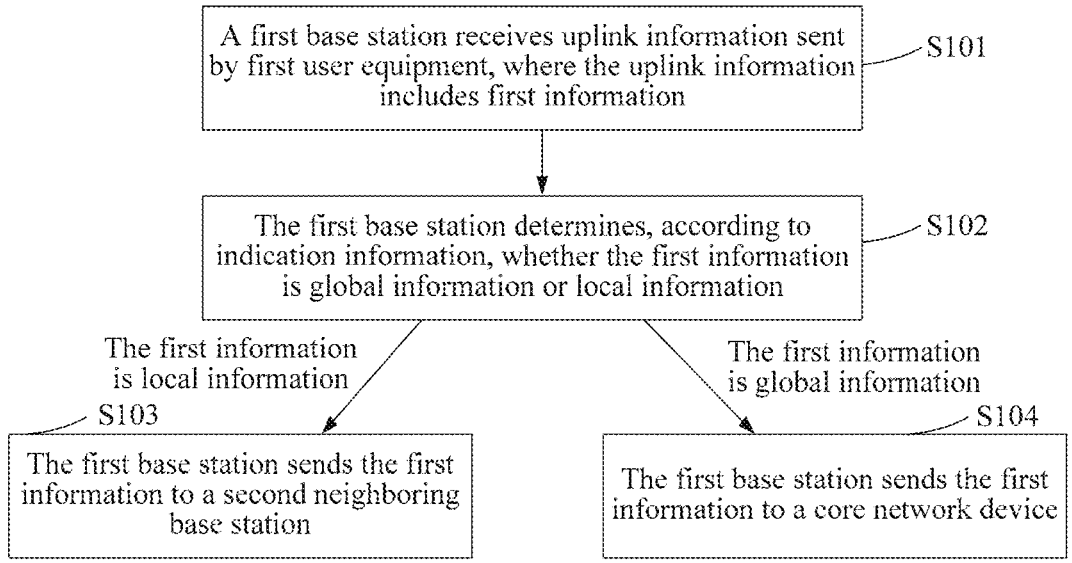
FIG. 2 is a flowchart of an information transmission method according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that, the technical solutions of the present invention may be applied to various communications systems, such as a GSM (Global System of Mobile Communications) system, a CDMA (Code Division Multiple Access) system, a WCDMA (Wideband Code Division Multiple Access) system, a GPRS (General Packet Radio Service) system, an LTE (Long Term Evolution, Long Term Evolution) system, an LTE-A (Long Term Evolution Advanced) system, and a UMTS (Universal Mobile Telecommunications System), and an intelligent transport system. This is not limited in embodiments of the present invention. However, for ease of description, the embodiments of the present invention are described by using an intelligent transport system as an example.

The embodiments of the present invention may be used in radio networks of different standards. A radio access network may include different network elements in different systems. For example, network elements on the radio access network in LTE and LTE-A include an eNB (eNodeB, evolved NodeB), and network elements on the radio access network in WCDMA include an RNC (Radio Network Controller, radio network controller) and a NodeB. Similarly, other radio networks such as WiMAX (Worldwide Interoperability for Microwave Access) may also use solutions similar to those in the embodiments of the present invention, and the only difference is that the related modules in a base station system may be different. This is not limited in the embodiments of the present invention. However, for ease of description, the following embodiments are described by using an eNodeB as an example.

It should further be understood that in the embodiments of the present invention, user equipment (UE, User Equipment) includes but is not limited to a mobile station (MS, Mobile Station), a mobile terminal (Mobile Terminal), a mobile telephone (Mobile Telephone), a handset (handset), portable equipment (portable equipment), and the like. The user equipment may communicate with one or more core networks by using a radio access network (RAN, Radio Access Network). For example, the user equipment may be a mobile telephone (or referred to as a "cellular" telephone), or a computer having a wireless communication function; or the user equipment may be a portable, pocket-sized, handheld, computer built-in, or in-vehicle mobile apparatus (for example, an OBU).

When mobile communication is implemented by using a cellular network, UE transmits information to a base station. The base station transmits the information to a core network by using an optical fiber. The core network processes the information and transmits the information to a base station by using an optical fiber, and the base station wirelessly transmits the information to a target UE. Because the core network needs to be used for communication between UEs, when the cellular network is directly applied to a high-speed movement scenario such as an intelligent transport system, a short-delay requirement cannot be met.

Although a wireless local area network technology features in a short delay, there is no core network in a wireless local area network system, and disadvantages exist in terms of security authentication and system scheduling. Consequently, roaming and handover cannot be implemented. In addition, a maximum speed supported by a wireless local area network is 70 km, and a requirement of the high-speed movement scenario such as the intelligent transport system cannot be met.

The embodiments of the present invention provide an information transmission method and user equipment. The embodiments of the present invention may be applied to a general cellular system or a dedicated trunked radio system. For example, in the embodiments of the present invention, a cellular network technology may be applied to a high-speed movement scenario (for example, an intelligent transport system). A one-hop communication solution is used in the embodiments of the present invention. That is, a base station directly delivers, to another user equipment without using a core network device, local information reported by user equipment, so as to reduce a delay of a communications system. Global information may be information used by a core network device, and local information may be information used by user equipment within coverage of a base station (that is, local user equipment). That is, information applied to an entire communications system is referred to as global information, and information applied to local user equipment of a base station is referred to as local information. Using an intelligent transport system as an example, global information may include information used by the intelligent transport system to perform transport control, and local information may include information used by vehicles within coverage of a base station to perform driving control.

It should be understood that although the embodiments of the present invention are described by using a scenario of the intelligent transport system as an example, the embodiments of the present invention are not limited thereto. For example, the embodiments of the present invention may be further applied to any other communications system that needs a delay to be reduced.

Referring to FIG. 1-a, FIG. 1-a is a schematic architectural diagram of a communications system 100 according to an embodiment of the present invention.

The communications system 100 includes a core network device 110, a first base station 120, user equipment 130, user equipment 140, a second base station 150, and user equipment 160. The first base station 120, the second base station 150, and the core network device 110 may be connected by using an optical fiber. The first base station 120 and the second base station 150 may communicate with the core network device 110 by using an S1 interface. The user equipments 130 and 140 are wirelessly connected to the first base station 120. The user equipment 160 is wirelessly connected to the second base station 150. The first base station 120 may communicate with the user equipments 130 and 140 by using an air interface. The second base station 150 may communicate with the user equipment 160 by using an air interface. The second base station is a base station adjacent to the first base station, the user equipment 130 and the user equipment 140 are both in a communications cell covered by the first base station 120, and the user equipment 160 is in a communications cell covered by the second base station 150. In addition, the communications system 100 may further include a data center or a control center (not shown). For example, the data center or the control center may be connected to the core network device by using an optical fiber. It should be understood that for ease of description, each of the user equipments 130, 140, and 160 does not refer to one terminal, but represents one type of terminal. During specific implementation, there may be one or more terminals.

The user equipment 130 is configured to send uplink information to the first base station 120. The first base station 120 is configured to: analyze the uplink information sent by the user equipment 130, and determine local information and global information in the uplink information. The first base station 120 may upload the global information to the core network device 110, and directly deliver the local information to another local user equipment 140. The core network device 110 is configured to process the global information. The user equipment 140 is configured to receive and use the local information. In addition, the data center is configured to implement functions such as path planning of an intelligent transport system and analysis on a vehicle safety status.

Referring to FIG. 1-b, FIG. 1-b is an application scenario of a transport communications system. When the first base station 120 receives the local information reported by the user equipment 130, to reduce a delay, the first base station 120 directly delivers the local information to the user equipment 140 in the communications cell covered by the first base station 120 without using a core network. However, because the user equipment 160 that is also very close to the user equipment 130 is not in the communications cell covered by the first base station 120, the user equipment 160 cannot obtain the local information reported by the user equipment 130. Consequently, because the user equipment 160 cannot receive comprehensive information, a security potential risk is brought when the user equipment 160 makes a decision. Therefore, the present invention provides an information transmission method. That is, the first base station 120 sends the local information reported by the user equipment 130 to a neighboring base station, for example, the second base station 150, and the second base station 150 can deliver the local information to the user equipment 160, so that each user equipment surrounding the user equipment 130 can obtain the local information reported by the user equipment 130, and perform, according to a change of an instant transport status in the local information, control and adjustment on a vehicle in which the user equipment is located.

Processing functions of the core network device and the user equipment are not limited in this embodiment of the present invention. For example, when the communications system 100 is an intelligent transport system, the user equipment 130 and the user equipment 140 may be on-board units (OBU), or may be vehicles attached with the on-board units, or may be other terminal devices. The core network device may perform processing such as security authentication, roaming, and handover according to the received global information, and the on-board unit may perform processing such as autonomous driving according to the received local information. This embodiment of the present invention is not limited thereto. In the intelligent transport system, the core network device and the user equipment further process information of different applications, such as entertainment information and shopping information.

Referring to FIG. 2, FIG. 2 is a flowchart of an information transmission method according to an embodiment of the present invention. The method includes the following steps.

S101: A first base station receives uplink information sent by first user equipment, where the uplink information includes first information, the first information includes indication information, the indication information is used to indicate whether the first information is global information or local information, and the first user equipment is in a communications cell covered by the first base station.

S102: The first base station determines, according to the indication information, whether the first information is the global information or the local information; and if the first base station determines that the first information is the local information, performs S103; or if the first base station determines that the first information is the global information, performs S104.

S103: The first base station sends the first information to a second base station, where the second base station is a base station that is in a preset neighboring cell list and that has a neighboring relationship with the first base station.

During specific implementation, the first base station may add a label to the first information, and the label is used to indicate, to the second base station, that the first information is the local information, so that the second base station may send the first information to second user equipment without parsing and determining the first information. The second user equipment is in a communications cell covered by the second base station. Generally, the second base station no longer forwards the first information to another base station and a core network.

In addition, the first base station may further send the first information to third user equipment in the communications cell covered by the first base station.

Communication between base stations may be implemented by using an X2 interface.

For data backup and statistics collection, the first base station may further send the first information to a core network device.

S104: The first base station sends the first information to a core network device.

In a possible design, the indication information may be a newly added indicator field in the first information, the indicator field is a first identifier or a second identifier, the first identifier is used to indicate that the first information is the global information, the second identifier is used to indicate that the first information is the local information, and the first identifier is different from the second identifier. The indicator field may be set by the user equipment according to a predetermined mechanism. The newly added indicator field mentioned in the present invention includes adding a new field, and further includes performing field replacement by using an existing special field, to distinguish between the global information and the local information.

Specifically, the indication information may be an indicator field or an indication domain or an indication bit in a sent packet, and is used to indicate whether information sent (or carried) in the packet is global information or local information. Using an indicator field as an example, the indicator field may be set in a data packet of the uplink information in this embodiment of the present invention. The indicator field may be a newly added field in a data packet of a normal frame format, or may be a reserved field in a data packet of a normal frame format. For example, one bit (bit) is used to indicate the local information or the global information. For example, the first identifier may be 0 and is used to indicate the global information, and the second identifier may be 1 and is used to indicate the local information. This embodiment of the present invention is not limited thereto. Alternatively, the first identifier and the second identifier may be a combination of other numbers and/or letters. Particularly, alternatively, the global information may be indicated by existence of the indicator field, and the local information may be indicated by non-existence of the indicator field. In this case, the first identifier is information filled in the field, and the second identifier is null (Null).

Several manners of carrying the indication information are described below in detail. Various types of indication information in this embodiment of the present invention may all be carried in the following manners.

(1) The indication information may be borne (or carried) on a physical uplink control channel (Physical Uplink Control Channel, PUCCH). For example, the uplink information may include control information and data information. The control information is sent on the PUCCH and the data information is transferred on a physical uplink shared channel (Physical Uplink Shared Channel, PUSCH). In this embodiment of the present invention, the indication information may be borne (or carried) on the PUCCH, and the global information or the local information may be borne on the PUSCH.

(2) The indication information may be indicated by using a reference signal. That is, the global information and the local information may be indicated by using different reference signals. For example, the indication information may be indicated in a reference signal (Reference Signal, RS) in each resource block (Resource Block, RB). The indication information may be indicated by improving an existing reference signal or by designing a new reference signal.

(3) The indication information may be indicated by using a preamble (preamble). That is, the global information and the local information may use different preambles.

Because the user equipment clearly identifies the global information and the local information in the uplink information, the base station can classify the uplink information by simply reading the indication information, so that the base station can quickly distinguish between the local information and the global information and quickly deliver the local information, so as to maximally reduce a delay of information transmission.

In an alternative solution in which the indicator field is included in the uplink information, the base station may determine the global information and the local information in the uplink information according to content and/or attribute features of the global information and the local information.

For example, the global information needing to be processed by the core network may be security and authentication information such as a user identifier and a password, and local information needing to be processed by local user equipment may be location information such as a longitude and a latitude. The base station may identify the two types of information by analyzing a difference between the two types of information in terms of content. Alternatively, the base station may identify the two types of information according to features (for example, lengths of data packets) of the two types of information. Such a solution can be implemented without reconstructing the user equipment, thereby simplifying a system design.

In a possible design, the indication information is destination address information, the destination address information is a first address or a second address, the first address is used to indicate that the first information is the global information, the second address is used to indicate that the first information is the local information, the first address is different from the second address, the first address includes an address of the core network device, and the second address includes an address other than the address of the core network device.

Specifically, the global information and the local information may be determined according to whether a destination address and a specific value are set in the uplink information. For example, when sending the global information, the user equipment may set a destination address in the uplink information, and when sending the local information, the user equipment may not set a destination address in the uplink information. In this way, if determining that there is no destination address in the uplink information, the base station may consider that the uplink information is the local information, and if determining that there is a destination address in the uplink information, the base station may consider that the uplink information is the global information. For another example, when sending the uplink information, the user equipment may set the destination address to a particular value. For example, when the destination address is set to 1, it indicates that the uplink information is the local information, or when the destination address is set to a value 2, it indicates that the uplink information is the global information. In addition, the address may alternatively be an explicit routing address, an IP address, an email address, or the like.

In a possible design, the indication information is a frame format of the first information, and the frame format includes a modulation scheme. The global information is modulated by using a first carrier, the local information is modulated by using a second carrier, and there is a preset phase difference between the first carrier and the second carrier. Therefore, frame format information of the global information is different from frame format information of the local information.

Specifically, the user equipment may modulate the global information and the local information in a particular location by using different modulation schemes, and the base station distinguishes between the global information and the local information by determining a modulation scheme of the uplink information. For example, the global information is modulated by using common binary phase shift keying (Binary Phase Shift Keying, BPSK), and the local information is modulated by using BPSK with 90-degree (or 45-degree) rotation.

In addition, the user equipment may alternatively set different frame lengths for the uplink information, and the base station distinguishes between the global information and the local information by determining a frame length of the uplink information. For example, a frame length of the global information is an odd number, and a frame length of the local information is an even number. Alternatively, the user equipment may set different quantities of fields for the uplink information, and the base station distinguishes between the global information and the local information by determining a quantity of fields in the uplink information. For example, the global information includes M fields, and the local information includes N fields. M is not equal to N, and M and N are integers. In a possible implementation, M is greater than N.

The foregoing several forms of the indication information may be correspondingly set when the user equipment sends the local information, and a specific setting process is determined according to an information processing mechanism of the user equipment that reports the local information.

In the present invention, the first user equipment and the second user equipment include on-board units attached to vehicles in an intelligent transport system, and implementations of the on-board unit include but are not limited to intelligent terminals such as a mobile phone, a tablet computer, an in-vehicle navigation system, an event data recorder, and a wearable device. The local information includes driving status information of vehicles on the Internet of Vehicles, and the driving status information is used by the second user equipment or the third user equipment to perform driving control.

According to this embodiment of the present invention, the first base station may identify, according to the indication information, the global information and the local information in the uplink information sent by the user equipment; and if the indication information indicates that the uplink information includes the global information, uploads the global information to the core network device; or if the indication information indicates that the uplink information includes the local information, directly delivers the local information to a neighboring base station, so that the neighboring base station can deliver the local information to user equipment in a cell covered by the neighboring base station, thereby shortening a transmission path of data information, reducing a transmission delay of the data information, and improving a transmission speed of the data information. Because the local information does not need to be forwarded by the core network, a transmission delay of the local information is reduced, and a delay of a communications system is reduced. In addition, load of the core network can also be alleviated when the local information is not processed by using the core network.

Figure 3:
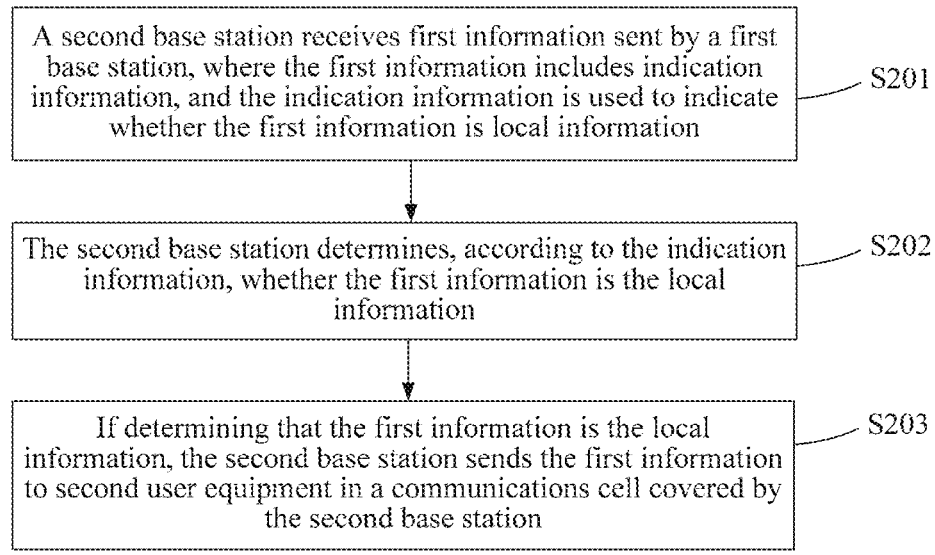
FIG. 3 is a flowchart of an information transmission method according to another embodiment of the present invention.

Referring to FIG. 3, FIG. 3 is a flowchart of an information transmission method according to another embodiment of the present invention. The method includes the following steps.

S201: A second base station receives first information sent by a first base station, where the first information includes indication information, the indication information is used to indicate whether the first information is local information, and the first base station is a base station that is in a preset neighboring cell list and that has a neighboring relationship with the second base station.

S202: The second base station determines, according to the indication information, whether the first information is the local information.

S203: If the second base station determines that the first information is the local information, the second base station sends the first information to second user equipment, where the second user equipment is in a communications cell covered by the second base station.

It should be noted that, if determining that the first information is not the local information, the second base station processes the first information according to an existing criterion.

The indication information herein is already explained in detail and described by using the examples in the foregoing embodiment, and details are not described herein again.

In addition, the indication information herein may alternatively be a label that is added to the first information when the first base station determines that the first information is the local information, and the label is used to indicate, to the second base station, that the first information is the local information. In this way, the second base station does not need to perform determining on the first information again, and does not need to perform repeated determining according to various features such as the foregoing indication field, the frame format, and the destination address. Instead, the first base station directly adds a uniform label, so that the second base station can more effectively and quickly identify that the first information is the local information, and quickly deliver the first information, so as to reduce a transmission delay.

Figure 4:
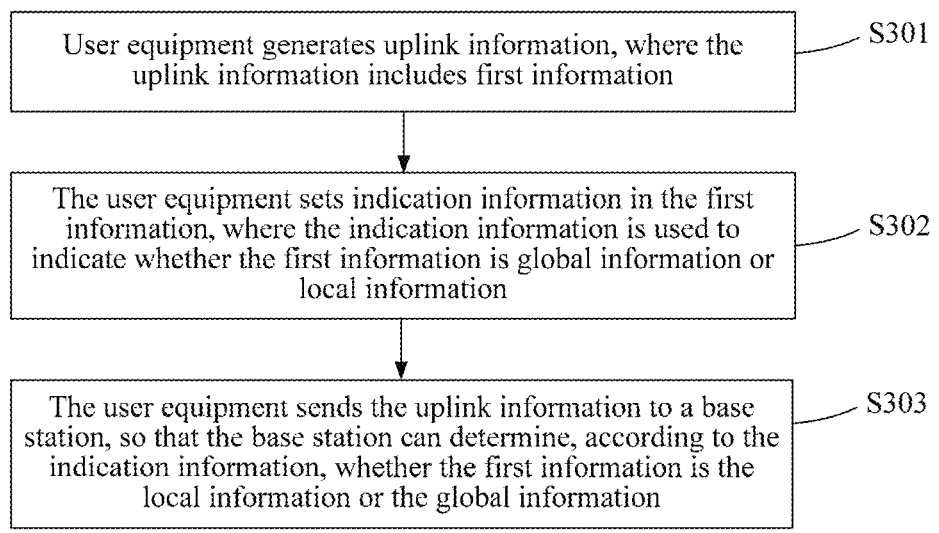
FIG. 4 is a flowchart of an information transmission method according to another embodiment of the present invention.

Referring to FIG. 4, FIG. 4 is a flowchart of an information transmission method according to another embodiment of the present invention. The method includes the following steps.

S301: User equipment generates uplink information, where the uplink information includes first information.

S302: The user equipment sets indication information in the first information, where the indication information is used to indicate whether the first information is global information or local information.

S303: The user equipment sends the uplink information to a base station, so that the base station can determine, according to the indication information, whether the first information is the local information or the global information.

During specific implementation, a manner of setting, by the user equipment, the indication information is already described in the foregoing embodiment, and details are not described herein again.

It should be understood that the user equipment may report the global information and the local information at the same time, or may separately report the global information and the local information. For example, in a network accessing process, the user equipment may report security authentication information to the core network device by using the base station. Alternatively, in a roaming and handover process, the user equipment may report roaming and handover related information to the core network device by using the base station. After accessing a network, the user equipment sends, to the base station, location information, speed information, and operation information such as vehicle steering, braking, and acceleration.

An intelligent transport communications system is used as an example below, a vehicle may generate different uplink information in different scenarios. For example, when accessing a network, the vehicle generates security authentication information, and when performing roaming and handover, the vehicle generates roaming and handover related information. During movement, the vehicle may generate information such as location information and speed information. The vehicle may further generate any other information, for example, entertainment information, needing to be reported in a normal intelligent transport system. For example, a vehicle 1 may detect a location of the vehicle 1 by using a GPS (Global Positioning System, Global Positioning System) carried in the vehicle 1, and may further detect a moving speed of the vehicle 1 by using a speed detection device carried in the vehicle 1. The in-vehicle device is the user equipment.

The user equipment may obtain, by using a particular APP and in a wireless communication manner, data sent by a sensing device in an in-vehicle system. The data reported by the sensing device is classified by the user equipment, and the data may be classified according to a type of information reported by a specific sensing device. A specific classification manner may be set according to a classification mechanism (which may be provided by an operator) of the user equipment. For example, when information reported by a sensor is a speed, acceleration, deceleration, braking, turning, an alarm, a lane change, a fault, or a pre-warning, the user equipment identifies the instant information as local information, and sets the information as the local information in the manner of adding a new field, setting destination target information, or setting a frame format, and identifies other information such as a vehicle body attribute as global information, and distinguishes between the global information and the local information in the manner of adding a new field, setting destination target information, or setting a frame format. An information setting manner of the user equipment may be matched with the base station in advance, so that the base station can identify the global information and the local information according to the information setting manner of the user equipment.

The user equipment sets the indication information in the first information in the uplink information, so that the base station classifies the uplink information, to effectively distinguish time validity/timeliness of different information. Therefore, the base station can distinguish, according to the indication information, local information having relatively high time validity/timeliness, and transfer the local information to another user equipment as soon as possible without using the core network, thereby effectively reducing a transmission delay.

Figure 5:
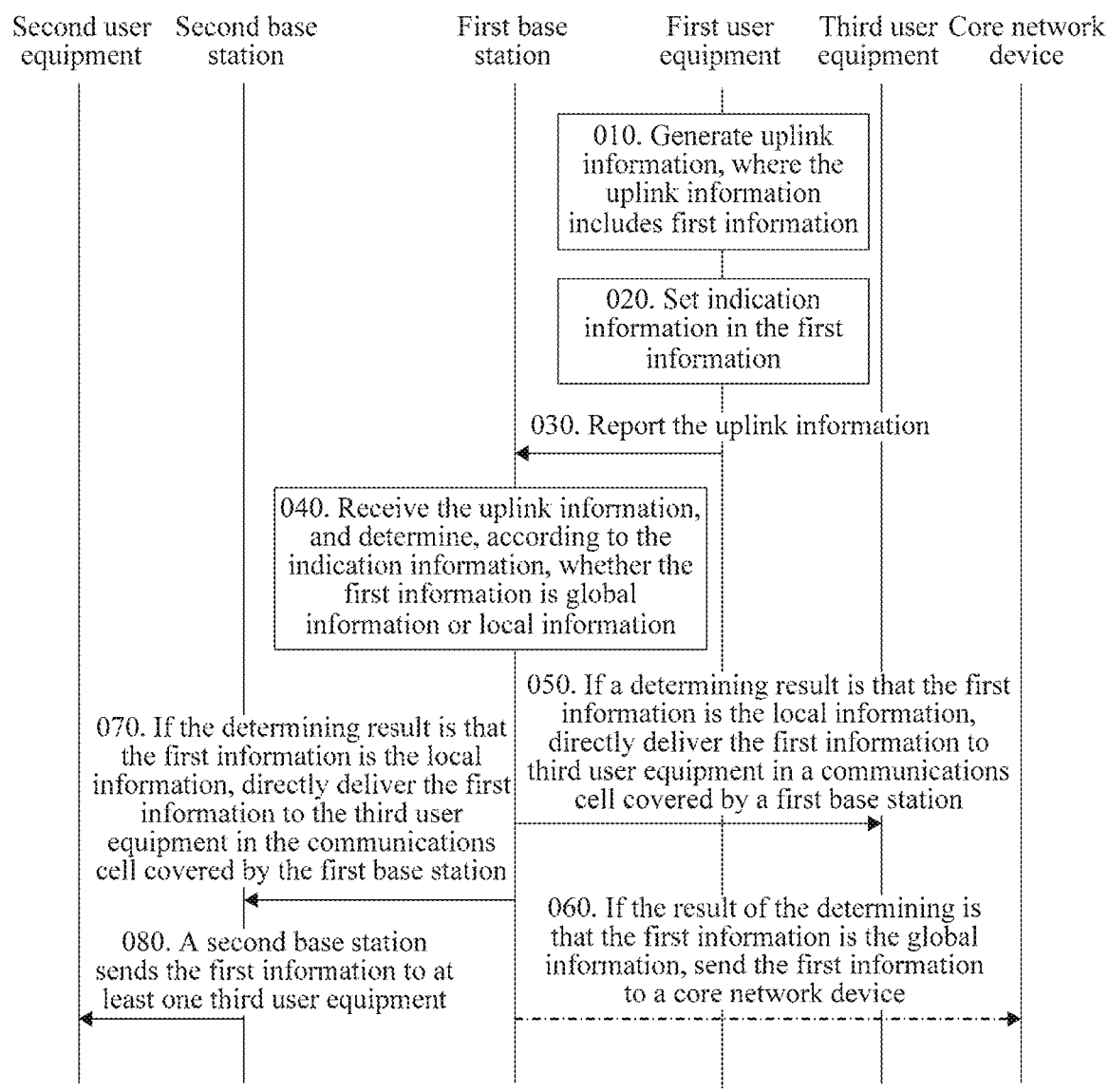
FIG. 5 is an information exchanging flowchart of a communications method according to an embodiment of the present invention.

Referring to FIG. 5, FIG. 5 is an information exchanging flowchart of a communications method according to an embodiment of the present invention. As shown in FIG. 1-a or FIG. 1-b and corresponding descriptions, the constitution of the intelligent transport system and basic communication are not described again. An exchanging process specifically includes the following steps.

Step 010: When detecting a lane position, a speed of a vehicle, a lane change of the vehicle, acceleration of the vehicle, turning of the vehicle, braking of the vehicle, a fault of the vehicle, a poor road condition, or occurrence of an accident or a natural disaster, first user equipment needs to transfer the information to a vehicle nearby within a shorter time to ensure security and a good order of a transport system due to very high timeliness of the transport information because the transport information directly affects driving safety and a driving policy of another vehicle on the road. The instant information belongs to the local information mentioned in the present invention. In addition, the first user equipment further reports, to a core network, basic conditions of the vehicle in which the first user equipment is located, for example, non-instant information such as a service life of engine oil, tire pressure, and a mileage. The information belongs to the global information mentioned in the present invention. The first user equipment may package the global information and the local information and send the global information and the local information together, or may separately send the global information and the local information. In this case, the first user equipment generates uplink information, and the uplink information may include a lot of information. For ease of description, the first information generally is a segment of sub information in the uplink information.

Step 020: When generating the uplink information, in order that a base station can accurately identify the global information and the local information in the uplink information, the first user equipment needs to set, for the first information by using an information setting mechanism of the first user equipment, a feature for determining that the first information is the global information or the local information.

Specifically, a new field may be added in a format of the information, so as to distinguish between the global information and the local information by using different field identifiers. The new field includes but is not limited to a letter and a number.

Specifically, the global information and the local information may alternatively be distinguished by using different address identifiers in a destination address field of the information. The address identifier includes but is not limited to an address code, an IP address, and an email address.

Specifically, the global information and the local information may alternatively be distinguished by using a frame format of the information, including but not limited to, by modulating the global information and the local information by using carriers having different phases.

Descriptions related to indication information are the same as the descriptions in the foregoing embodiments, and details are not described herein again.

Step 030: After generating the uplink information and processing the first information in the uplink information, the first user equipment reports the uplink information to a first base station.

Step 040: The first base station receives the uplink information reported by the first user equipment, and determines, according to indication information set by the first user equipment, whether the first information in the uplink information is the global information or the local information; and if the first information is the local information, performs step 050 and step 070; or if the first information is the global information, performs step 060.

Step 050: After determining that the first information is the local information, the first base station directly sends the first information to third user equipment. For ease of description, the third user equipment generally is user equipment in a communications cell covered by the first base station, and a quantity of third user equipments and names of the third user equipments are not limited. Different from the prior art, the first base station does not need to report the local information to a core network device, so that a time spent for transmitting the information from the first base station to the first base station through the core network is saved, thereby greatly reducing a delay of the local information. Therefore, the local information having a very high requirement on timeliness can be quickly sent to surrounding user equipment of the first user equipment, a sudden transport condition can be well controlled and dealt with, and security, reliability, and stability of the transport system can be ensured.

A manner of delivering, by the base station, the information to the user equipment is not limited in this embodiment of the present invention. The base station may broadcast the local information to local user equipment by using an air interface. This embodiment of the present invention is not limited thereto. For example, the base station may alternatively send the local information to target user equipment in a multicast or unicast manner.

Step 060: After determining that the first information is the global information, the first base station sends the first information to the core network device, so that the core network performs further processing, including storage, backup, statistic collection, grouping, delivering, and the like. The global information does not have a high requirement on real-time performance.

A manner of sending, by the base station, the global information to the core network device is not limited in this embodiment of the present invention. The base station may upload the information to the core network device in a normal manner (for example, a manner in which a base station in an LTE system uploads information to a core network device). For example, the base station may upload the global information to the core network device by using an S1 interface. This embodiment of the present invention is not limited thereto. Alternatively, another normal manner of communication between a base station and a core network device may be used.

Step 070: After determining that the first information is the local information, the first base station may further send the first information to a second base station. For ease of description, the second base station generally is a base station that is in a preset neighboring cell list and that has a neighboring relationship with the first base station, and a quantity of second base stations and names of the second base stations are not limited. After determining that the first information is the local information, the first base station may add a label to the first information, so that the second base station does not need to parse and determine information such as an indicator field, a destination address, and a frame format of the first information, and instead, analyzes and determines the first information in a faster manner of identifying only the label. Therefore, a time spent for parsing and determining the first information is saved.

Step 080: The second base station receives the first information sent by the first base station. Because information received by the second base station is diverse, the second base station also needs to determine whether the first information is the local information. A determining manner may be: determining, according to the indication information set by the first user equipment, whether the first information is the global information or the local information, or may be: determining, according to the label added by the first base station in step 070, whether the first information is the global information or the local information. If a determining result is that the first information is the local information, the first information is directly sent to second user equipment. For ease of description, the second user equipment generally is user equipment in a communications cell covered by the second base station, and a quantity of second user equipments and names of the second user equipments are not limited. Different from the prior art, the first base station does not need to report the first information to the core network device, so that a time spent for transmitting the information from the first base station to the second base station through the core network or from the second base station to the second base station through the core network is saved, thereby greatly reducing a delay of the local information. Therefore, the local information having a very high requirement on timeliness can be quickly sent to the second user equipment in the cell covered by the second base station. In this way, user equipments surrounding the first user equipment can quickly obtain the first information, and vehicles in an entire area can make a proper decision, and can well control and deal with a sudden transport condition, thereby ensuring security, reliability, and stability of the transport system.

It should be noted that, not all the foregoing steps are in a strict chronological order.

Optionally, when the first information is the local information, the first base station may send the first information to the core network device.

Optionally, if the first base station receives uplink information sent by multiple first user equipments, and correspondingly, the multiple pieces of first information are all local information, the first base station may process the received multiple pieces of first information according to a preset rule, to obtain first local information, and then the first base station sends the first local information to at least one third user equipment or the second base station.

That the first base station processes the received multiple pieces of first information according to the preset rule, to obtain the first local information includes: If identical content exists in at least one piece of first information, parts that are of the at least one piece of first information and that have the identical content are combined, to obtain the first local information. The processing the multiple pieces of first information according to the preset rule may be represented by using a term "aggregation". For example, the aggregation may also be referred to as compression. Aggregation of the local information may be a process of combining the parts that are of the at least one piece of first information and that have the identical content, so as to reduce or remove redundant information in the local information, thereby improving resource utilization and the transmission efficiency. In addition, aggregation of the local information may mean that the at least one piece of first information is directly combined for sending, so as to improve resource utilization. The first base station may separately deliver, to another user equipment, information uploaded by different first user equipments, or may aggregate information of different first user equipments and then deliver the aggregated information to another user equipment. Further, the first base station may aggregate information that is uploaded by same user equipment at different time points and then deliver the aggregated information to another user equipment, or may aggregate information that is uploaded by different user equipments at a same time point or at different time points and then deliver the aggregated information to another user equipment. By means of information aggregation, load of information transmission can be alleviated, and the transmission efficiency can be improved.

For example, assuming that user equipment A has a speed of 100 km/h at a time point T0, and has a speed of 100 km/h at time points T0+1, T0+2, T0+3, and T0+4, after information of the user equipment A in a time period from T0+1 to T0+4 is aggregated, local information may be set to "0", to indicate that compared with the speed at the time point T0, speeds at the time points T0+1 to T0+4 remain unchanged.

For example, if the user equipment A has a speed of 100 km/h at a time point T0, and user equipments B, C, D, and E also have a speed of 100 km/h at the time point T0, information of different equipments at the time point T0 may be aggregated to 100 km/h. That is, the user equipments all have a speed of 100 km/h at the time point T0.

For another example, respective speed information of different user equipments A, B, C, D, and E at time points T0 to T0+4 may be aggregated to 100 km/h.

Redundant information in the local information can be removed in all the foregoing several aggregation manners, and occupation of transmission resources is reduced. Therefore, the transmission efficiency can be improved.

It should be noted that, the uplink information includes global information and local information that are sent by same user equipment in at least one first user equipment, or global information and local information that are respectively sent by different user equipments in at least one user equipment. Specifically, each user equipment may send at least one of local information or global information at the same time. For example, it may be that one user equipment sends global information and local information at the same time. Alternatively, it may be that one user equipment sends global information, and another user equipment sends local information.

Figure 6:
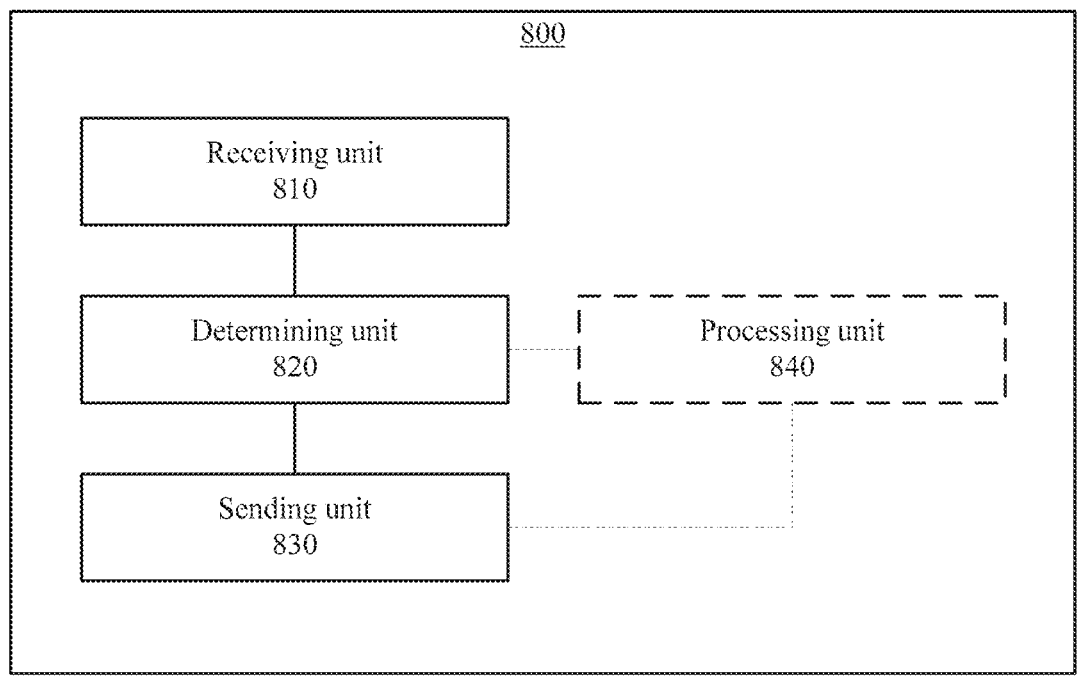
FIG. 6 is a schematic structural diagram of a base station according to an embodiment of the present invention.

Referring to FIG. 6, FIG. 6 is a schematic structural diagram of a base station 800 according to an embodiment of the present invention.

Two base stations are described below.

The base station 800 includes a receiving unit 810, a determining unit 820, and a sending unit 830.

The receiving unit 810 is configured to receive uplink information sent by first user equipment, where the uplink information includes first information, the first information includes indication information, the indication information is used to indicate whether the first information is global information or local information, and the first user equipment is in a communications cell covered by the base station 800.

The determining unit 820 is configured to determine, according to the indication information in the uplink information received by the receiving unit 810, whether the first information is the global information or the local information.

The sending unit 830 is configured to: if the determining unit 820 determines that the first information is the local information, send the first information to a second base station, where the second base station is a base station that is in a preset neighboring cell list and that has a neighboring relationship with the base station 800, and the sending unit 830 is further configured to: if the determining unit 820 determines that the first information is the global information, send the first information to a core network device.

Optionally, the sending unit 830 is further specifically configured to: if the determining unit 820 determines that the first information is the local information, send the first information to third user equipment, where the third user equipment is in the communications cell covered by the base station 800.

Optionally, in another embodiment, if the receiving unit 810 receives uplink information sent by at least one first user equipment and the determining unit 820 determines that at least one piece of corresponding first information is local information, the base station further includes:

a processing unit 840, configured to process the received at least one piece of first information according to a preset rule, to obtain first local information; and the sending unit 830 sends the first local information to at least one second user equipment.

According to this embodiment of the present invention, if identical content exists in the at least one piece of first information, the processing unit 840 combines parts that are of the at least one piece of first information and that have the identical content, to obtain the first local information.

Another base station 800 includes a receiving unit 810, a determining unit 820, and a sending unit 830.

The receiving unit 810 is configured to receive first information sent by a base station 800, where the first information includes indication information, the indication information is used to indicate whether the first information is local information, and the base station 800 is a base station that is in a preset neighboring cell list and that has a neighboring relationship with the another base station.

The determining unit 820 is configured to determine, according to the indication information in the uplink information received by the receiving unit 810, whether the first information is global information or the local information.

The sending unit 830 is configured to: if the determining unit 820 determines that the first information is the local information, send the first information to second user equipment, where the second user equipment is in a communications cell covered by the another base station.

Optionally, in another embodiment, if the receiving unit 810 receives uplink information sent by at least one first user equipment and the determining unit 820 determines that at least one piece of corresponding first information is local information, the another base station further includes:

a processing unit 840, configured to process the received at least one piece of first information according to a preset rule, to obtain first local information; and the sending unit 830 sends the first local information to at least one second user equipment.

According to this embodiment of the present invention, if identical content exists in the at least one piece of first information, the processing unit 840 combines parts that are of the at least one piece of first information and that have the identical content, to obtain the first local information.

For operations and functions of the units of the base station 800, refer to the corresponding methods and any possible implementation in FIG. 2 and FIG. 3. To avoid repetition, details are not described herein again.

According to this embodiment of the present invention, the first base station may identify, according to the indication information, the global information and the local information in the uplink information sent by the user equipment; and if the indication information indicates that the uplink information includes the global information, upload the global information to the core network device; or if the indication information indicates that the uplink information includes the local information, directly deliver the local information to the neighboring base station, so that the neighboring base station can deliver the local information to user equipment in a cell covered by the neighboring base station. Because the local information does not need to be forwarded by a core network, a transmission delay of the local information is reduced, and a delay of a communications system is reduced. In addition, load of the core network can also be alleviated when the local information is not processed by using the core network. Particularly, in a transport system, when a vehicle brakes, accelerates, or decelerates, the vehicle can quickly send the driving status information to a vehicle nearby by using a local base station and a neighboring base station, thereby avoiding a traffic accident.

Figure 7:
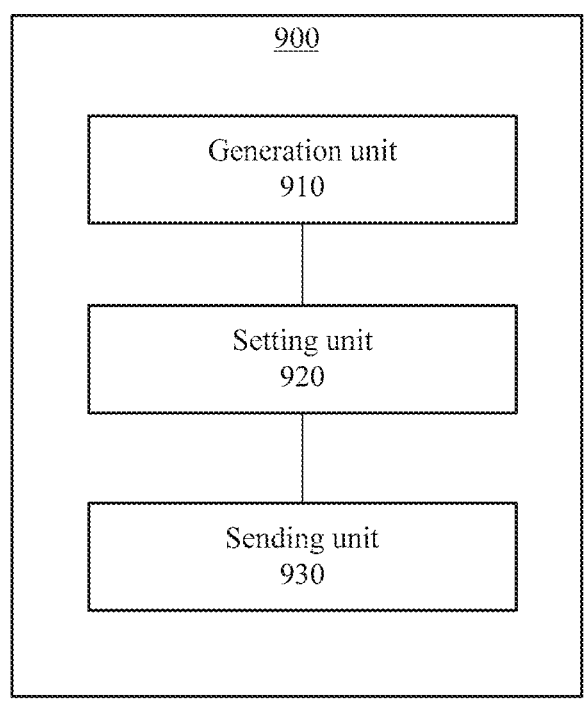
FIG. 7 is a schematic structural diagram of user equipment according to an embodiment of the present invention.

FIG. 7 is a schematic structural diagram of user equipment 900 according to an embodiment of the present invention. The user equipment 900 in FIG. 7 includes a generation unit 910, a setting unit 920, and a sending unit 930.

The generation unit 910 is configured to generate uplink information, where the uplink information includes first information. The setting unit 920 is configured to set indication information in the first information, where the indication information is used to indicate whether the first information is global information or local information. The sending unit 930 is configured to send the uplink information to a base station, so that the base station can determine, according to the indication information, whether the first information is the local information or the global information.

According to this embodiment of the present invention, the user equipment may set the indication information of the global information and the local information in the sent uplink information, so that the base station can identify the global information and the local information in the uplink information sent by the user equipment, upload the global information to a core network device, and directly deliver the local information to another local user equipment. Because the local information does not need to be forwarded by a core network, a transmission delay of the local information is reduced, and a delay of a communications system is reduced.

According to this embodiment of the present invention, the indication information includes an indicator field added to the first information, the indicator field includes a first identifier or a second identifier, the first identifier is used to indicate that the first information is the global information, the second identifier is used to indicate that the first information is the local information, and the first identifier is different from the second identifier. The setting unit 920 is specifically configured to: if the first information is the global information, set the first identifier in the indicator field; or if the first information is the local information, set the second identifier in the indicator field.

Alternatively, in another embodiment, the indication information includes destination address information. The setting unit 920 is specifically configured to: if the first information is the global information, set, in the first information, destination address information used to indicate that the first information is sent to a core network device; or if the first information is the local information, set, in the first information, destination address information used to indicate that the first information is sent to at least one second user equipment.

Alternatively, in another embodiment, the indication information is frame format information, frame format information of the global information is different from frame format information of the local information, and the frame format information includes one of the following information: a modulation scheme of the first information, a length of a frame of the first information, or a quantity of fields in the frame of the first information. The setting unit 920 is specifically configured to: if the first information is the global information, set a frame format of the first information as a frame format of the global information; or if the first information is the local information, set a frame format of the first information as a frame format of the local information.

For operations and functions of the units of the user equipment 900, refer to the method in FIG. 4. To avoid repetition, details are not described herein again.

The user equipment sets the indication information in the first information in the uplink information, so that the base station classifies the uplink information, to effectively distinguish time validity/timeliness of different information. Therefore, the base station can distinguish, according to the indication information, local information having a relatively high requirement on time validity/timeliness, and transfer the local information to another user equipment as soon as possible without using the core network, thereby effectively reducing a transmission delay.

Figure 8:
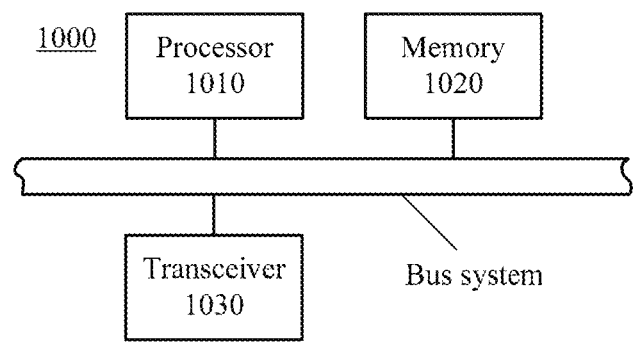
FIG. 8 is a schematic structural diagram of a base station according to an embodiment of the present invention.

Referring to FIG. 8, FIG. 8 is a schematic structural diagram of a base station 1000 according to an embodiment of the present invention. The base station 1000 includes a processor 1010, a memory 1020, a transceiver 1030, and a bus system. The processor 1010, the memory 1020, and the transceiver 1030 are connected to and communicate with each other by using the bus system. The memory 1020 is configured to store an instruction. The processor 1010 is configured to execute the instruction. The transceiver 1030 is configured to communicate with user equipment under control of the processor.

In this way, for the base station 1000, the transceiver 1030 is configured to receive uplink information sent by first user equipment, where the uplink information includes first information, the first information includes indication information, and the indication information is used to indicate whether the first information is global information or local information. The processor 1010 is configured to determine, according to the indication information in the uplink information, whether the first information is the global information or the local information. The transceiver 1030 is further configured to: if the processor 1010 determines that the first information is the local information, send the first information to a second base station, where the second base station is a base station that is in a preset neighboring cell list and that has a neighboring relationship with the base station 1000.

In this way, for another base station 1000, the transceiver 1030 is configured to receive the first information sent by the first base station, where the first information includes the indication information, the indication information is used to indicate whether the first information is the local information, and the first base station is a base station that is in a preset neighboring cell list and that has a neighboring relationship with the base station 1000. The processor 1010 is configured to determine, according to the indication information, whether the first information is the global information or the local information. The transceiver 1030 is further configured to: if the processor 1010 determines that the first information is the local information, send the first information to second user equipment, where the second user equipment is in a communications cell covered by the base station 1000.

For operations and functions of the units of the base station 1000, refer to any possible implementation corresponding to FIG. 2 and FIG. 3. To avoid repetition, details are not described herein again.

Figure 9:
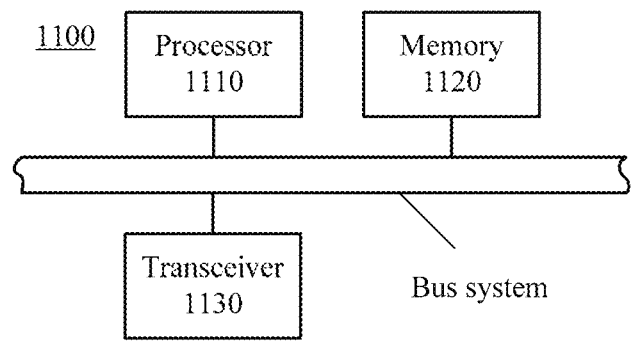
FIG. 9 is a schematic structural diagram of user equipment according to an embodiment of the present invention.

FIG. 9 is a schematic structural diagram of user equipment 1100 according to an embodiment of the present invention. The user equipment 1100 includes a processor 1110, a memory 1120, a transceiver 1130, and a bus system. The processor 1110, the memory 1120, and the transceiver 1130 are connected to and communicate with each other by using the bus system. The memory 1120 is configured to store an instruction. The processor 1110 is configured to execute the instruction. The transceiver 1130 is configured to communicate with user equipment under control of the processor.

The processor 1110 is configured to: generate uplink information, where the uplink information includes first information; and set indication information in the first information, where the indication information is used to indicate whether the first information is global information or local information. The transceiver 1130 is configured to send the uplink information to a base station, so that the base station can determine, according to the indication information, whether the first information is the local information or the global information.

According to this embodiment of the present invention, the user equipment may set the indication information of the global information and the local information in the sent uplink information, so that the base station can identify the global information and the local information in the uplink information sent by the user equipment, upload the global information to a core network device, and directly deliver the local information to another local user equipment. Because the local information does not need to be forwarded by a core network, a transmission delay of the local information is reduced, and a delay of a communications system is reduced.

For operations and functions of the units of the user equipment 1100, refer to any possible implementation corresponding to FIG. 4. To avoid repetition, details are not described herein again.

The embodiments of the present invention further provide a communications system that may include the user equipment and the base station described in the foregoing embodiments. Particularly, a communications system similar to the communications system shown in FIG. 1-*a* includes a base station (which corresponds the first base station in FIG. 1-*a*) corresponding to FIG. 2, another base station (which corresponds the second base station in FIG. 1-*a*) corresponding to FIG. 3, and user equipments in communications cells covered by the two base stations. The user equipment has functions corresponding to FIG. 4. The user equipment 130 corresponds to the first user equipment, the user equipment 140 corresponds to the third user equipment, and the user equipment 160 corresponds to the second user equipment.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:
1. An information transmission method, wherein the method comprises:

receiving, by a first base station, uplink information sent by first user equipment, wherein the uplink information comprises first information, the first information comprises indication information, the indication information indicates whether the first information is global information or local information, and the first user equipment is in a communications cell covered by the first base station;

determining, by the first base station according to the indication information, whether the first information is the global information or the local information; and in response to determining that the first information is the local information:

aggregating, by the first base station, the first information with a second information which is a local information received from a second user equipment to obtain first local information; and sending, by the first base station, the first local information to a second base station, wherein the second base station is a base station that is in a preset neighboring cell list and that has a neighboring relationship with the first base station; and in response to determining that the first information is the global information, sending, by the first base station, the first information to a core network device.

2. The method according to claim 1, wherein, in response to determining that the first information is the local information, the method further comprises: adding, by the first base station, a label to the first information, wherein the label indicates, to the second base station, that the first information is the local information, to cause the second base station to send the first information to third user equipment, wherein the third user equipment is in a communications cell covered by the second base station.

3. The method according to claim 1, wherein, in response to determining that the first information is the local information, the method further comprises: sending, by the first base station, the first information to fourth user equipment, wherein the fourth user equipment is in the communications cell covered by the first base station.

4. The method according to claim 3, wherein the local information comprises driving status information of vehicles on Internet of Vehicles, and the driving status information is used by the fourth user equipment to perform driving control.

5. The method according to claim 1, wherein the indication information is a newly added indicator field in the first information, the indicator field is a first identifier or a second identifier, the first identifier indicates that the first information is the global information, the second identifier indicates that the first information is the local information, and the first identifier is different from the second identifier.

6. The method according to claim 1, wherein the indication information is destination address information, the destination address information is a first address or a second address, the first address indicates that the first information is the global information, the second address indicates that the first information is the local information, the first address is different from the second address, the first address comprises an address of the core network device, and the second address comprises an address other than the address of the core network device.

7. The method according to claim 1, wherein the indication information indicates a frame format of the first information, the frame format comprises a modulation scheme, the global information is modulated by a first carrier, the local information is modulated by a second carrier, and there is a preset phase difference between the first carrier and the second carrier.

8. An information transmission method, wherein the method comprises:

receiving, by a second base station, first local information sent by a first base station, wherein the first local information comprises indication information, the indication information indicates the first local information is local information, and the first base station is a base station that is in a preset neighboring cell list and that has a neighboring relationship with the second base station, wherein the first local information is obtained by the first base station through aggregating a first information with a second information, wherein the first information is a local information received from a first user equipment and the second information is a local information received from a second user equipment;

determining, by the second base station according to the indication information, whether the first local information is the local information; and in response to determining that the first local information is the local information, sending, by the second base station, the first local information to third user equipment, wherein the third user equipment is in a communications cell covered by the second base station.

9. The method according to claim 8, wherein the indication information is a label that is added to the first information in response to determining that the first information is the local information, and the label indicates, to the second base station, that the first information is the local information.

10. The method according to claim 8, wherein the indication information is a newly added indicator field in the first information, the indicator field is a first identifier or a second identifier, the first identifier indicates that the first information is global information, the second identifier indicates that the first information is the local information, and the first identifier is different from the second identifier.

11. The method according to claim 8, wherein the indication information is destination address information, the destination address information is a first address or a second address, the first address indicates that the first information is global information, the second address indicates that the first information is the local information, the first address is different from the second address, the first address comprises an address of a core network device, and the second address comprises an address other than the address of the core network device.

12. The method according to claim 8, wherein the indication information indicates a frame format of the first information, the frame format comprises a modulation scheme, global information is modulated by a first carrier, the local information is modulated by a second carrier, and there is a preset phase difference between the first carrier and the second carrier.

13. A base station, wherein the base station comprises:

a receiver configured to receive uplink information sent by first user equipment, wherein the uplink information comprises first information, the first information comprises indication information, the indication information indicates whether the first information is global information or local information, and the first user equipment is in a communications cell covered by the base station;

a processor configured to:

determine, according to the indication information in the uplink information received by the receiver, whether the first information is global information or local information;

in response to determining that the first information is the local information, aggregating the first information with a second information which is a local information received from a second user equipment to obtain first local information; and a transmitter configured to:

in response to determining that the first information is the local information and the processor aggregating the first information with the second information which is the local information received from a second user equipment to obtain first local information, send the first local information to a second base station, wherein the second base station is a base station that is in a preset neighboring cell list and that has a neighboring relationship with the base station; and in response to determining that the first information is the global information, send the first information to a core network device.

14. The base station according to claim 13, wherein the transmitter is further configured to: in response to determining that the first information is the local information, add a label to the first information, wherein the label indicates, to the second base station, that the first information is the local information, to cause the second base station sends the first information to third user equipment, wherein the third user equipment is in a communications cell covered by the second base station.

15. The base station according to claim 13, wherein the transmitter is further configured to: in response to determining that the first information is the local information, send the first information to fourth user equipment, wherein the fourth user equipment is in the communications cell covered by the base station.

16. The base station according to claim 15, wherein the local information comprises driving status information of vehicles on Internet of Vehicles, and the driving status information is used by fourth user equipment to perform driving control.

17. The base station according to claim 13, wherein the indication information is a newly added indicator field in the first information, the indicator field is a first identifier or a second identifier, the first identifier indicates that the first information is the global information, the second identifier indicates that the first information is the local information, and the first identifier is different from the second identifier.

18. The base station according to claim 13, wherein the indication information is destination address information, the destination address information is a first address or a second address, the first address indicates that the first information is the global information, the second address indicates that the first information is the local information, the first address is different from the second address, the first address comprises an address of the core network device, and the second address comprises an address other than the address of the core network device.

19. The base station according to claim 13, wherein the indication information indicates a frame format of the first information, the frame format comprises a modulation scheme, the global information is modulated by a first carrier, the local information is modulated by a second carrier, and there is a preset phase difference between the first carrier and the second carrier.

* * * * *